(12) United States Patent
Kolodner et al.

(10) Patent No.: US 8,068,229 B2
(45) Date of Patent: Nov. 29, 2011

(54) OPTOFLUIDIC DEVICES

(75) Inventors: Paul Kolodner, Hoboken, NJ (US); Tom Krupekin, Madison, WI (US); Oleksandr Sydorenko, Philadelphia, PA (US); Joseph A. Taylor, Madison, WI (US)

(73) Assignee: Alcatel Lucent, Paris (FR)

( * ) Notice: Subject to any disclaimer, the term of this patent is extended or adjusted under 35 U.S.C. 154(b) by 386 days.

(21) Appl. No.: 12/433,131

(22) Filed: Apr. 30, 2009

(65) Prior Publication Data

US 2010/0277721 A1   Nov. 4, 2010

(51) Int. Cl.
 *G01N 21/55* (2006.01)
(52) U.S. Cl. ....................................................... 356/445
(58) Field of Classification Search ................... 356/445
See application file for complete search history.

(56) References Cited

U.S. PATENT DOCUMENTS 7,525,722 B2 * 4/2009 Kolodner et al. ............. 359/296
* cited by examiner

*Primary Examiner* — Roy M Punnoose
(74) *Attorney, Agent, or Firm* — Brosemer, Kolefas & Assoc.

(57) ABSTRACT

An optofluidic device forming a liquid grating, a liquid detector or a liquid emitter and method(s) of operation.

20 Claims, 15 Drawing Sheets

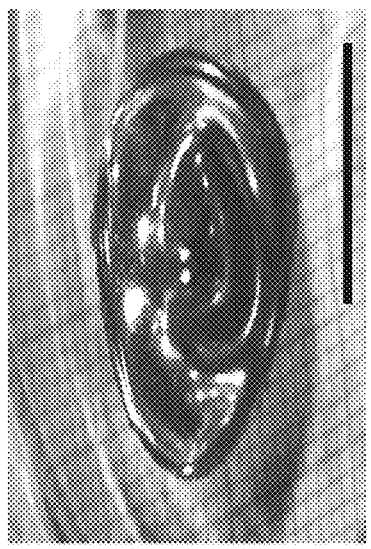
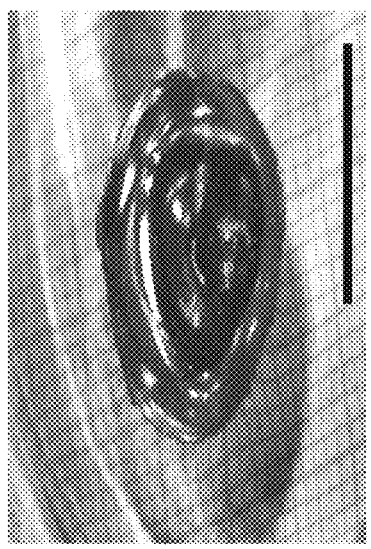
FIG. 5(g)
FIG. 5(f)
FIG. 5(e)

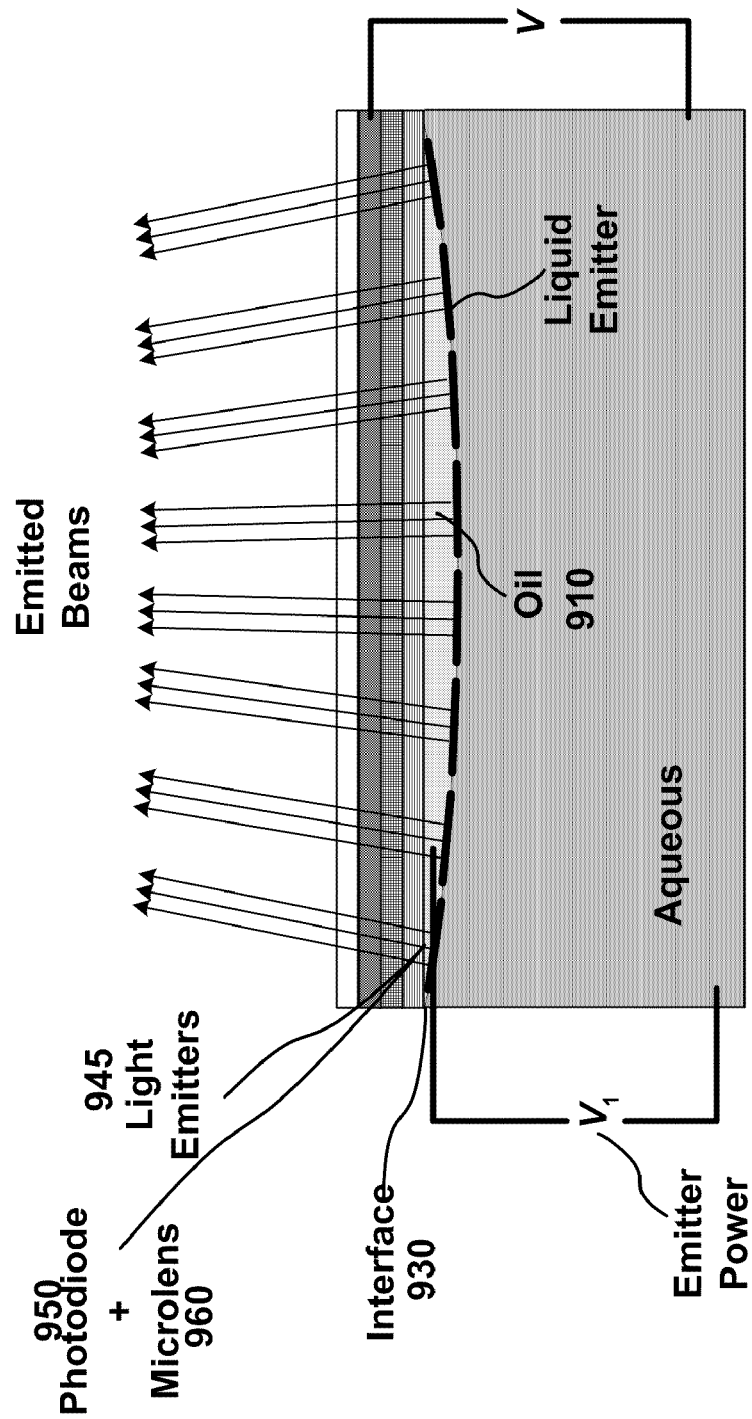

OPTOFLUIDIC DEVICES

FIELD OF THE DISCLOSURE

This disclosure relates generally to the field of optofluidics.

BACKGROUND OF THE DISCLOSURE

Optofluidics generally refers to a class of structures that integrate optical and fluidic structures. This integration of optical and fluidic structures enables devices exhibiting desirable degrees of flexibility and reconfigurability.

SUMMARY OF THE DISCLOSURE

An advance is made in the art according to an aspect of the present disclosure directed to optofluidic devices employing optical gratings, light emitters or light detectors disposed upon a liquid interface.

BRIEF DESCRIPTION OF THE DRAWING

A more complete understanding of the present disclosure may be realized by reference to the accompanying drawings in which:

FIG. 4(*b*) is a photomicrograph showing hexagonal optical particles fabricated according to an aspect of the present disclosure;

FIG. 5(*c*) is a photomicrograph showing the self assembly of optical particles into an optofluidic device when disposed upon a liquid/liquid interface according to an aspect of the present disclosure;

FIG. 5(*d*) is a photomicrograph showing a droplet of oil containing optical particles in suspension floated on a water surface according to an aspect of the present disclosure;

FIGS. 5(*e*), 5(*f*) and 5(*f*) are a series of photomicrographs showing the optofluidic device undergoing acoustic excitation;

FIG. 9(*b*) shows a simplified schematic of a number of LED particles self assembling into an emitting optofluidic device and FIG. 9(*c*) shows a representative cross-section of an LED element;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

By way of some additional background, simple reflective optofluidic structures have been described by the instant applicants in for example, U.S. Pat. No. 7,525,722 directed to a liquid mirror and issued on Apr. 28, 2009—the entire contents of which are hereby incorporated by reference herein. The applicants therein describe a liquid mirror which includes a liquid that forms an interface with—for example— another immiscible liquid. The liquid mirror disclosed includes a layer of reflective particles disposed at the interface such that the layer forms a simple reflective surface.

As noted by the applicants therein several benefits are derived by using a liquid mirror comprising a layer of reflective particles located at an interface of a liquid, e.g., a liquid/liquid interface, a liquid/gas interface, or a liquid/vacuum interface. In particular, since a broad range of different types of reflective materials can be incorporated into the reflective particles, the reflective particles may advantageously exhibit a higher reflectivity and lower toxicity as compared to—for example—a liquid reflector such as mercury. Additionally, by carefully choosing the composition of the reflective particles, the particles can be configured to form a substantially continuous reflective surface. Finally, the shape of the liquid can be changed, which can further alter the shape of the reflective layer. Such shape changing may be advantageously performed dynamically if so desired.

Figure 1:
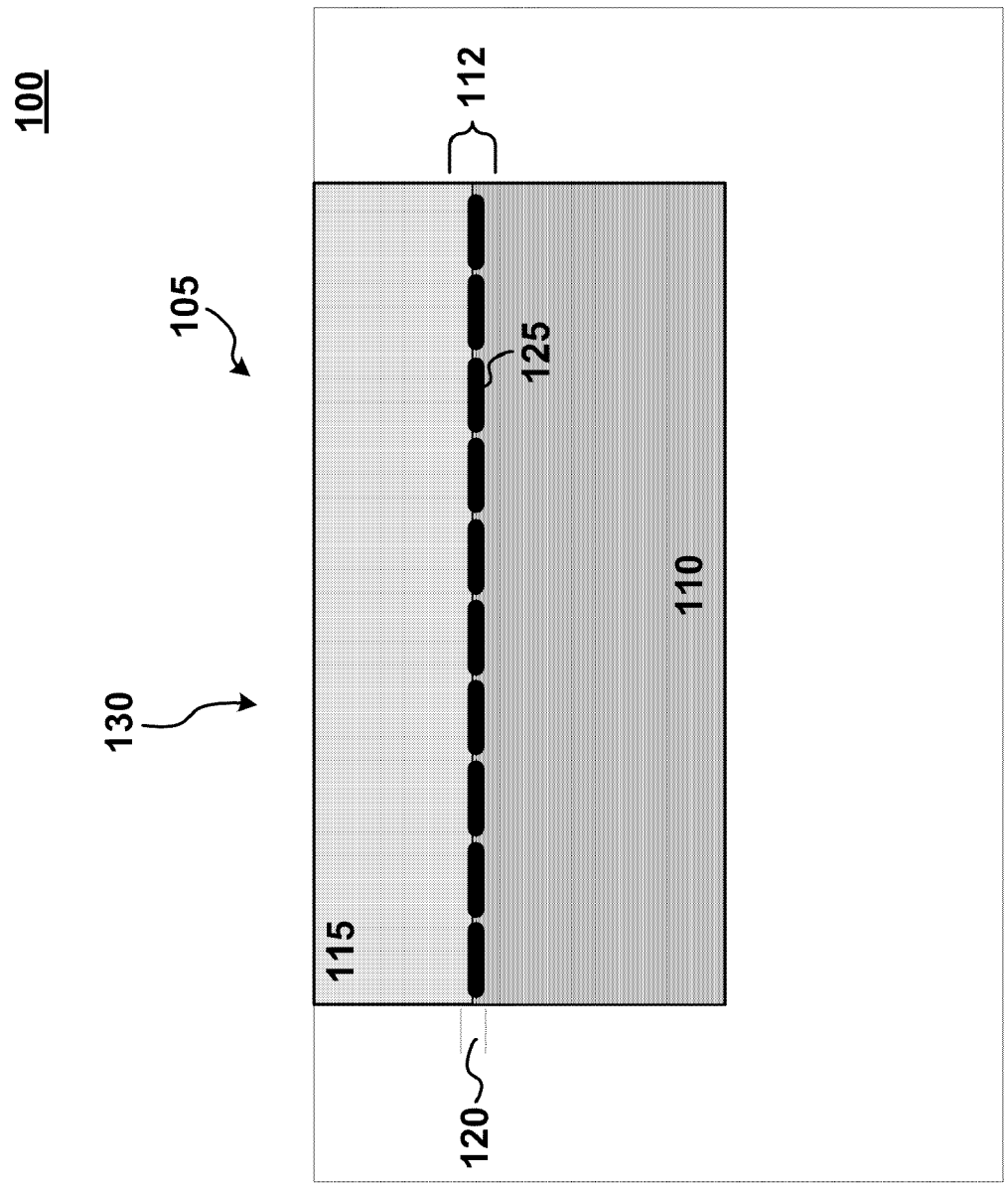
FIG. 1 is a schematic diagram of an exemplary prior art reflective optofluidic device.

Turning now to FIG. 1 there is shown a schematic of a representative reflective liquid mirror device. The device 100 comprises a reflective liquid mirror 105 that includes a first liquid 110 that forms an interface 112 with—for example—a second liquid 115 (immiscible with the first liquid) positioned in contact with the first liquid 110. The liquid mirror 105 also includes a layer 120 of reflective particles 125 located at/upon the liquid/liquid interface 112. As can be readily appreciated, the layer 120 forms a reflective surface 130.

As implied above, while we have used the term liquid/liquid interface, it is notable that the interface may as well be a liquid/gas interface or a liquid/vacuum interface. As can be appreciated, such an interface provides a surface at/upon which particles such as those used herein may be disposed.

Returning to our discussion, we note that such reflective surfaces are commonly called substantially continuous reflective surfaces, because light striking such reflective surfaces is substantially reflected from the surface as opposed to being transmitted through the surface. That is, the gaps between the reflective particles 125 do not lead to large amounts of transmission for such surfaces. At most a small percentage of the incident light intensity is transmitted through such surfaces, e.g., less than about 30 percent of the incident intensity or, in some embodiments, even less than about 10 percent of said intensity. As can be appreciated, such a reflective surface is preferably smooth.

When the liquid 110 and the second liquid 115 are sufficiently immiscible with one another, an interface such as 112 is formed. For example, when the first liquid 110 may comprise a polar liquid such as water or ethanol, and the second liquid 115 may preferably comprise a non-polar liquid, e.g., an alkane or a hydrocarbon-based oil, or suitable substitutes therefor.

Figure 2:
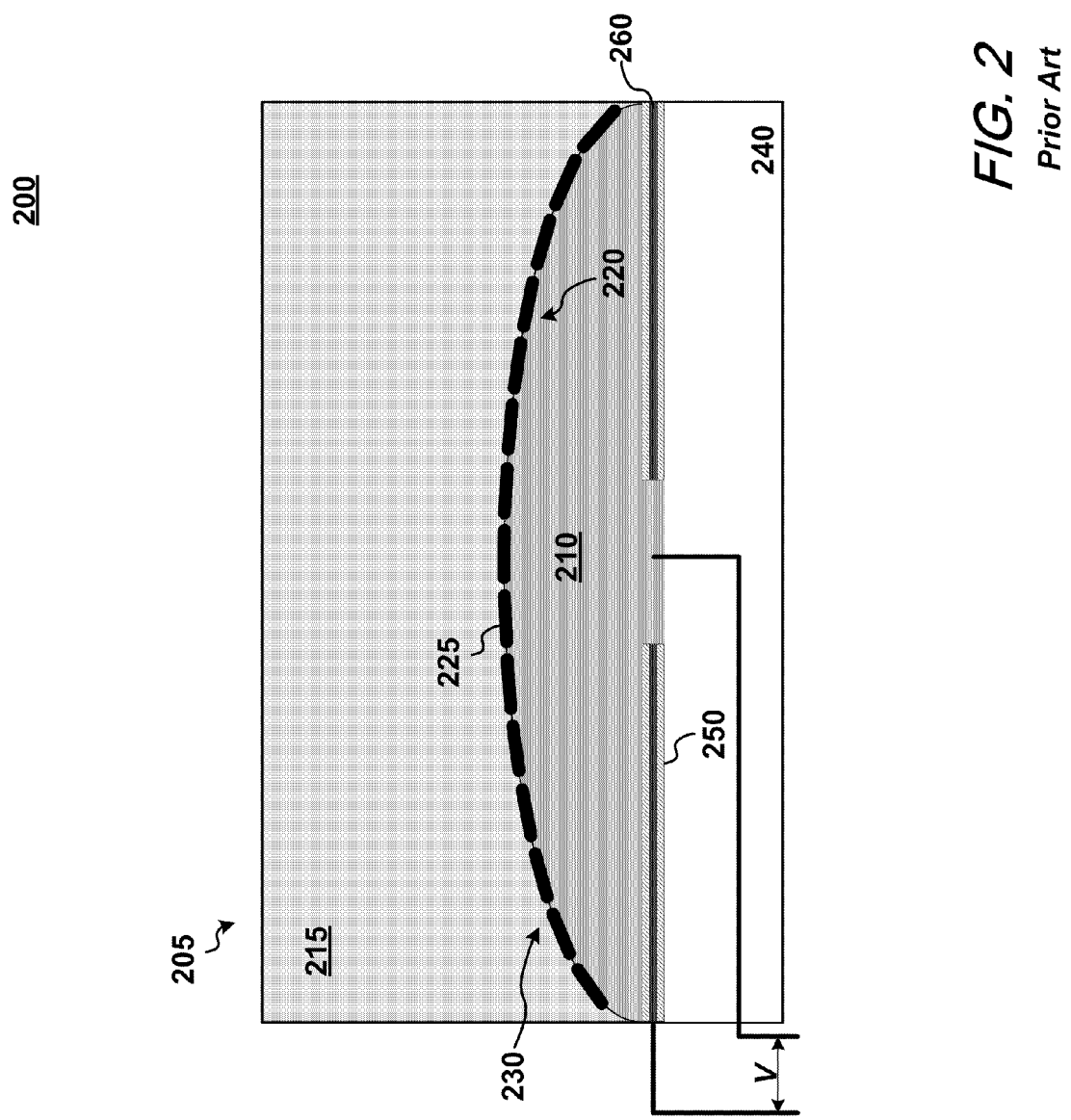
FIG. 2 is a schematic diagram of a second exemplary prior art reflective optofluidic device.

Turning now to FIG. 2 there is shown a schematic of a second representative prior art reflective device. The device 200 comprises a reflective convex liquid mirror 205 that includes a liquid 210 that forms a convex interface with—for example—a gas 215 in contact with the liquid 210. The convex liquid mirror 205 includes a layer 220 of reflective particles 225 located at the convex interface between the liquid 210 and the gas 215. As can be readily appreciated, the layer 220 forms a convex reflective surface 230.

As shown in FIG. 2, the liquid 210 is generally disposed upon a substrate 240. Shown overlying the substrate 240 are one or more electrode layers 250 and one or more insulating layers 260. Advantageously, such a configuration results in a liquid mirror having a tunable focal length.

In such embodiments, the electrodes 250 may be drivable to selectably adjust the shape of the interface between liquid 210 and gas 215 when a potential is applied between the liquid 210 and one or more of the electrodes 250. As can be readily appreciated by those skilled in the art, when the shape of the interface changes, certain reflective characteristics of the liquid mirror will change as well. More particularly, when the underlying liquid 210 changes shape, its focusing behavior, e.g., its focal length, is changed as well, and the resulting structure is therefore tunable.

With these preliminary structures in mind, we now note that conventional devices have provided basic optical properties and in particular, reflection. One aspect of the present disclosure, then, is to provide optofluidic devices providing higher-order optical processing such as tunable diffraction, refraction, light generation and/or detection. Accordingly, the optofluidic devices which are the subject of the present disclosure are constructed using more complex particles disposed upon/at a liquid-liquid (or liquid-gas or liquid vacuum) interface (hereinafter generally referred to as "liquid-liquid" interface or just "liquid" interface).

Generally, the particles disposed upon/at the liquid-liquid interface and employed in the present disclosure may advantageously be shaped as necessary and convenient. For example, silicon hexagons of diameter 8 μm having a thickness of 1 μm are preferable for certain applications.

More particularly, such hexagonal particles may be coated with a thin layer of gold on one face while leaving another face bare. A differential chemical functionalization of the gold and bare faces results which advantageously produces an anisotropy with respect to the wettability of the particles. In particular, the gold face is substantially more hydrophobic than the bare face.

Consequently, when disposed upon or into an oil or other droplet having an interface with—for example—an aqueous interface, these "Janus" particles/tiles sediment to the liquid-liquid interface. Herein, a Janus particle is a particle having opposite surfaces with incompatible wetting properties, e.g., one of the surfaces may be hydrophobic and the other of the surfaces may be hydrophilic. Example Janus particles with opposing silicon and gold surfaces would typically align to be substantially parallel to the interface between a polar liquid phase and a non-polar liquid phase such that their gold surfaces face the nonpolar liquid phase and face away from the polar liquid phase./thus forming a concave optofluidic structure.

By applying a voltage between substrate 240 and the liquid droplet 210, the shape of the optofluidic structure may be changed and thereby affecting the optical properties thereof, e.g., the focal length of a curved reflector.

Figure 3:
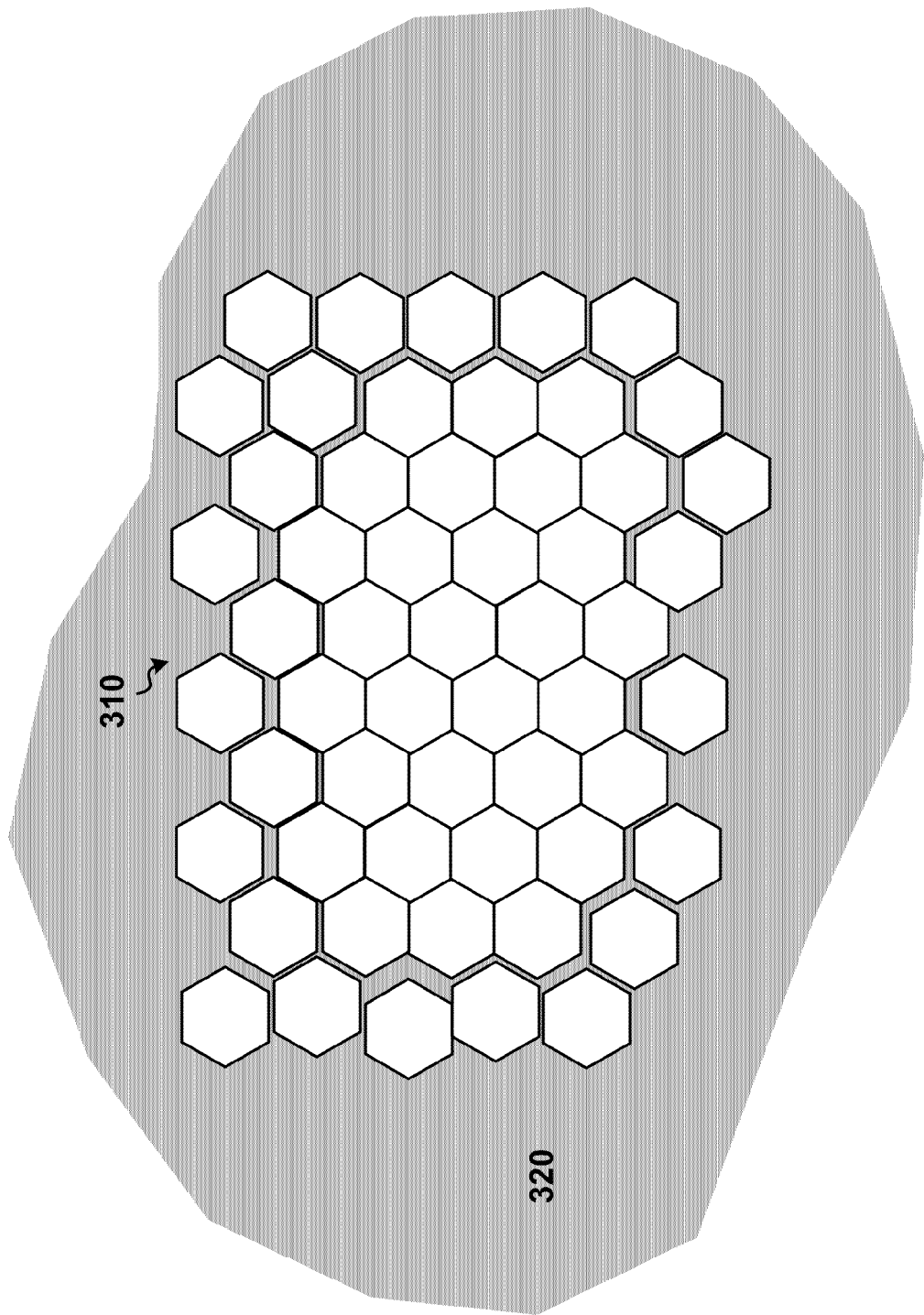
FIG. 3 is a schematic showing the self-assembly of hexagonal Janus particles disposed upon/at a liquid interface according to an aspect of the present disclosure.

Turning now to FIG. 3 there is shown a schematic of a plurality of hexagonally-shaped particles 310 disposed upon a liquid interface 320 such as those already described. More particularly, a layer of particles (Janus particles) sediments onto that interface 320, and the resulting layer comprises a number of the particles 310 each shown exhibiting an exemplary hexagonal shape. As they sediment, the particles 310 may self-align and become substantially arranged into a larger, regularly ordered, two-dimensional, optical structure.

Advantageously, the production of large numbers of substantially identical Janus particles may be conveniently achieved with conventional photolithographic techniques as described below.

Figure 4A:
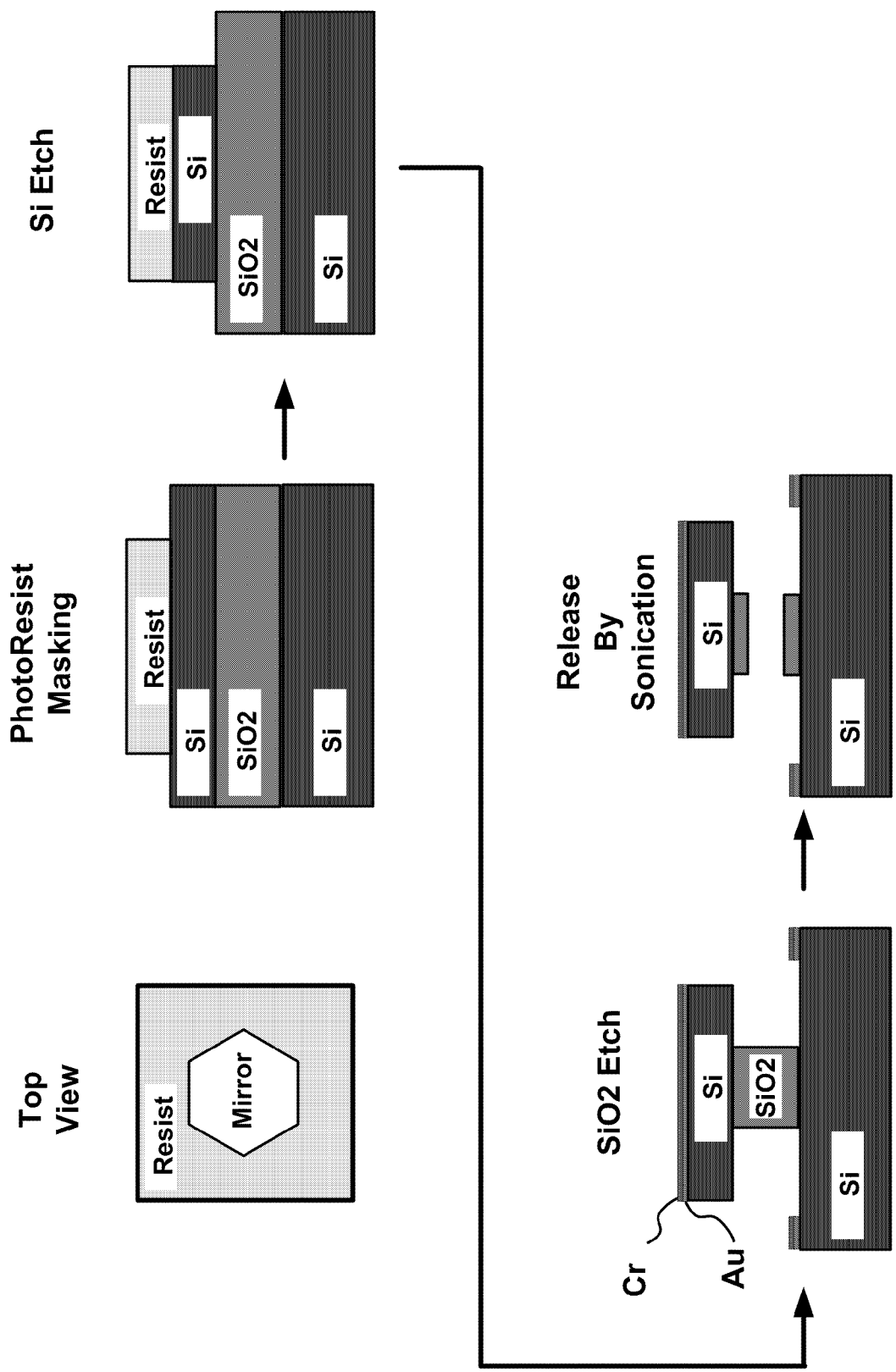
FIG. 4(*a*) depicts the representative photolithographic fabrication of Janus particles according to an aspect of the present disclosure.
Figure 4B:
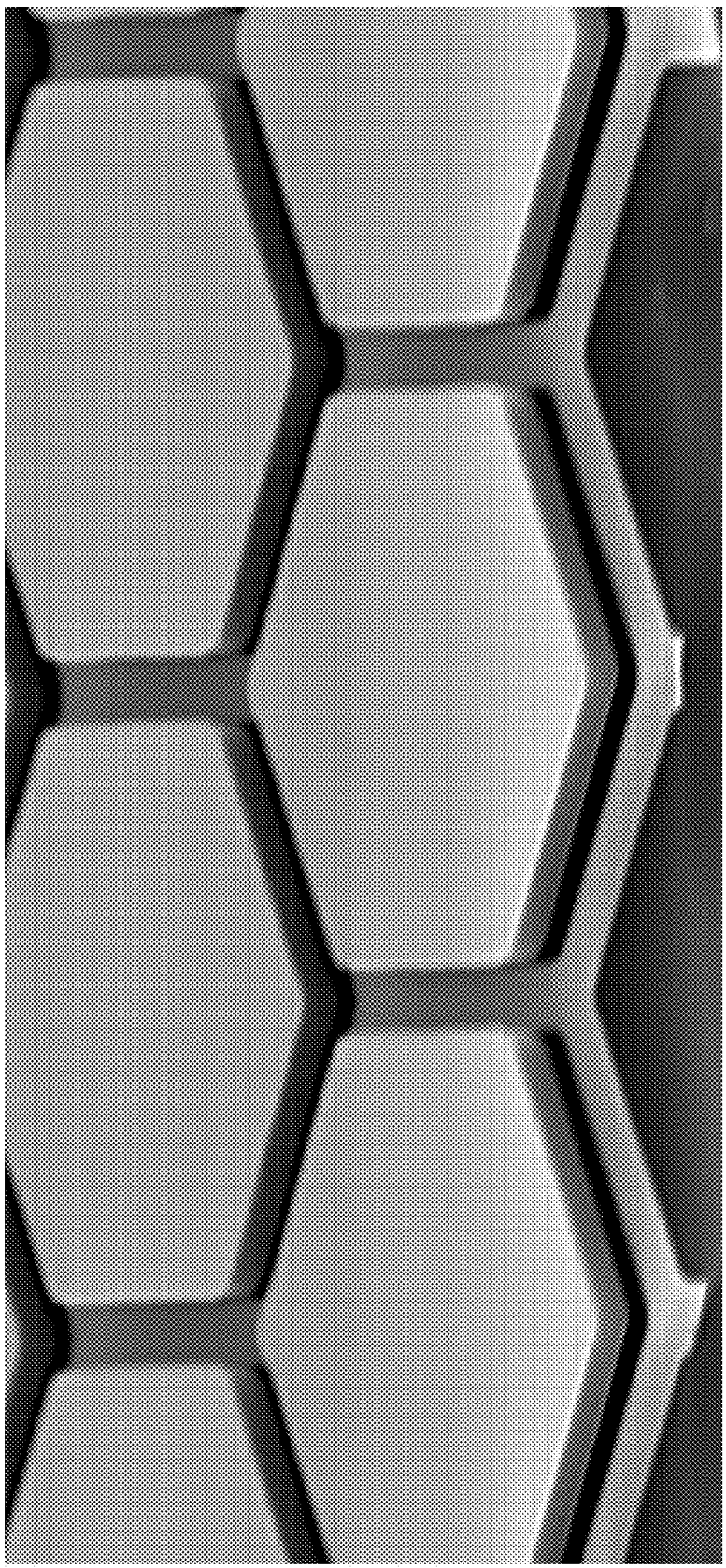

As shown schematically in FIG. 4(*a*), photolithographic and dry-etching techniques including the partial dissolution of underlying SiO2 leaves particles attached to a substrate by "stalks" that can be fractured by—for example—sonication. More specifically, silicon-on-insulator (SOI) wafers (e.g., 1 μm Si with a ~0.4 μm buried SiO2 layer) may be processed using deep-UV lithography (for example, at 248 nm) and dry reactive ion etching (DRIE) to produce, e.g., about 8 μm diameter and about 1 μm thick silicon hexagons.

Following the DRIE, the wafers may be treated with 5% Hydrofluoric Acid for approximately 1 hour until on a thin $SiO_2$ stalk, e.g., an approximately 1 μm diameter $SiO_2$ stalk, remains attaching each individual particle to the underlying silicon substrate. This weak attachment allows the particles to be subsequently separated from the substrate by sonication.

Subsequently, an exemplary 7 nm thick Cr adhesion layer and subsequent 100 nm thick Au reflecting layer may be deposited by e-beam evaporation to produce a reflecting surface. The wafers are then diced and treated with a base piranha etch solution (for example, 1:1:1 NH4OH:30% H2O2: diH2O) for 15 minutes. As those skilled in the art may readily appreciate, further modification to surface energies of the gold and silicon faces may be effected by the use of organothiols and/or organosilanes as necessary and/or as desired thereby improving upright-to-flipped orientations of produced Janus particles when located at interfaces between polar and nonpolar liquids. Such exemplary Janus particles are shown in a photomicrograph of FIG. 4(*b*).

With reference now to FIG. 5(*a*) and FIG. 5(*b*), there is shown the self-assembly of such Janus particles into an optofluidic device according to an aspect of the present disclosure.

Figures 5A, 5B:
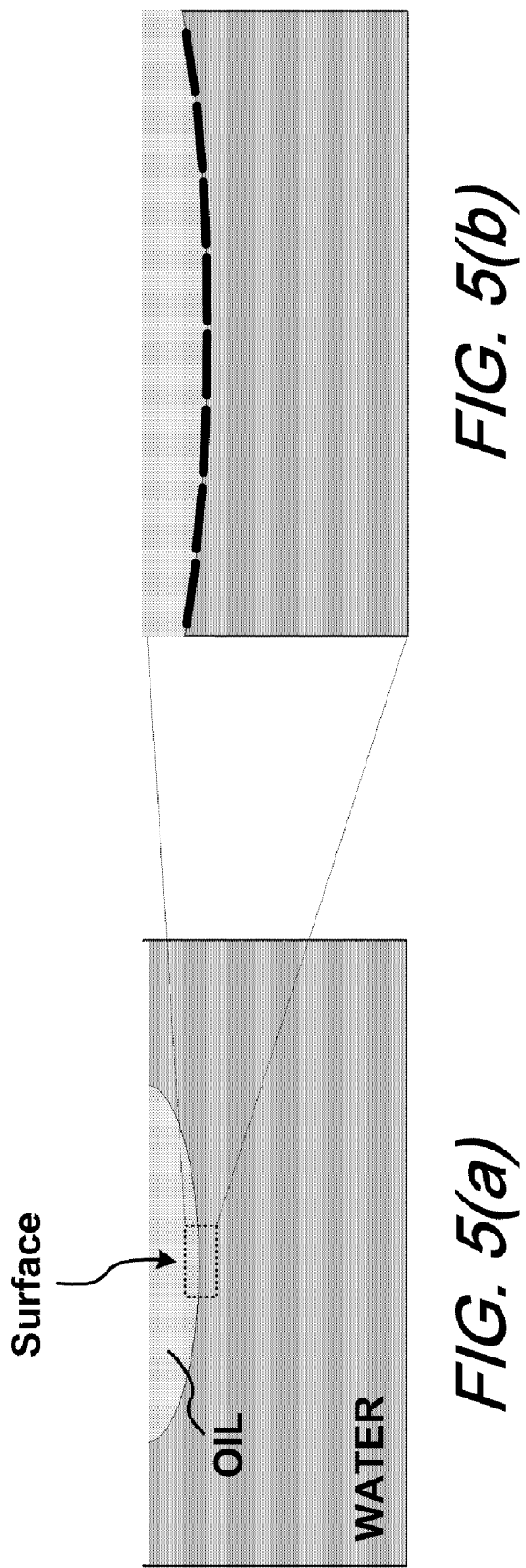
FIG. 5(*a*) and FIG. 5(*b*) show the self assembly of optical particles into an optofluidic device when disposed upon a liquid/liquid interface according to an aspect of the present disclosure.
Figure 5C:
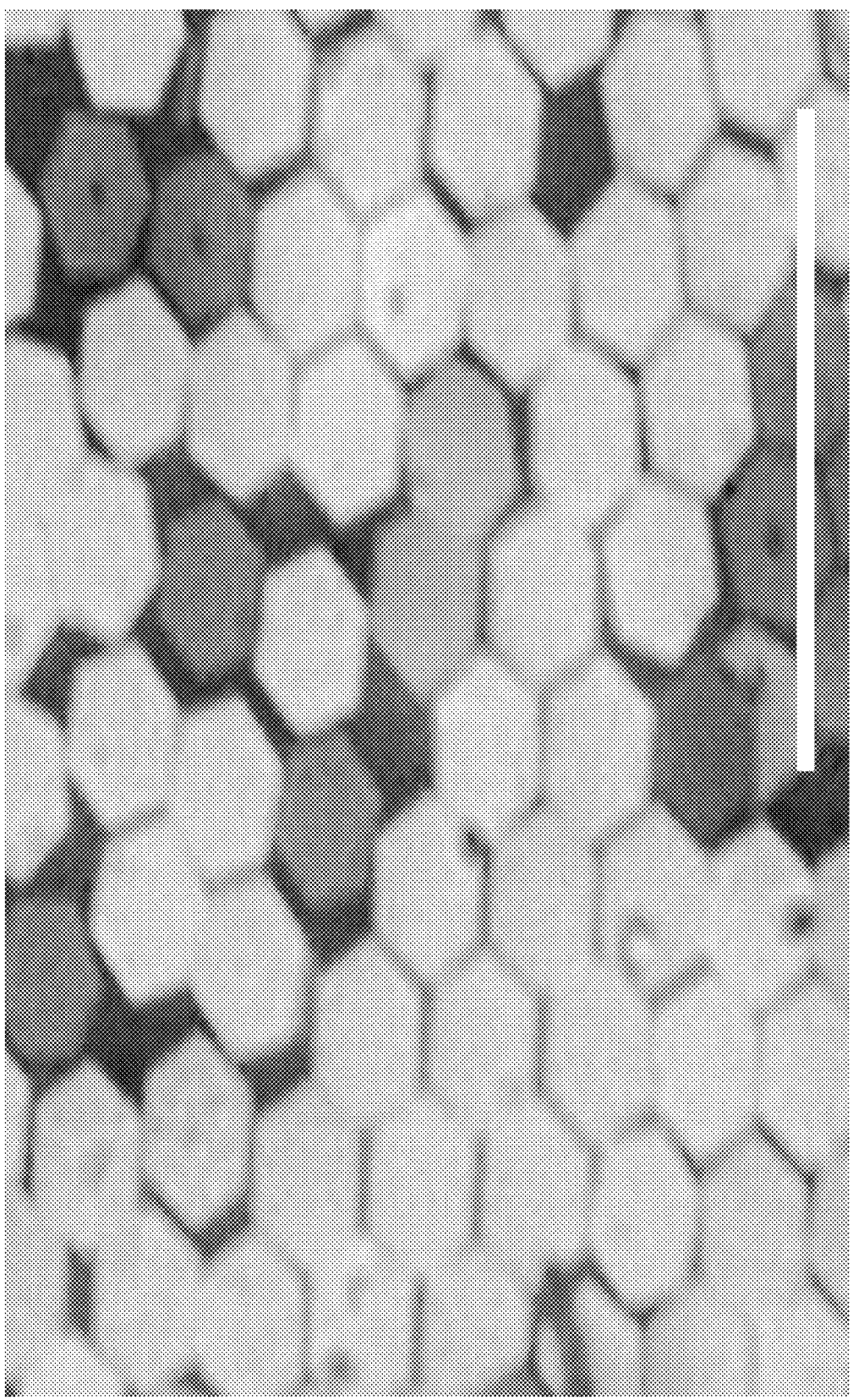

As depicted, a droplet of oil containing the particles in suspension is floated onto a polar liquid which may be, for example, water. When so disposed, the particles sediment onto the oil-water interface. As can now be appreciated, the particles assemble at the oil-water interface with their gold faces (not specifically shown) preferentially oriented towards the oil phase, i.e., in an upright orientation. This upright orientation of the particles is energetically favorable over the flipped orientation in which the gold faces towards the polar liquid due to the relative surface energies of the gold and silicon faces in different liquids. Nevertheless, not all of the particles necessarily orient with the upright orientation, i.e., as desired. As can be seen in FIG. 5(b), the optofluidic device resulting from the particle rearrangement at a oil-water interface also will exhibit any curvature of the oil-water interface, wherein the curvature results from the size of the liquid droplet of one liquid phase. The self arrangement of the particles is shown in the photomicrograph of FIG. 5(c).

By way of specific example, the particles may be released into ~500 μl of oil by sonication into a small cuvette, and a droplet of the particle-containing suspension may then be deposited onto the surface of water. Over the course of several minutes, the particles will disperse and sediment onto the oil-water interface and "self-assemble" into an optofluidic device, with the gold faces of the particles predominantly facing towards the oil phase due in part to the different wetting properties of the two faces of the particles.

Satisfactory optofluidic devices may be constructed using, e.g., water (specific gravity $\rho_{25}$=0.997) for the polar liquid phase and an aliphatic or aromatic organic liquid, e.g., an oil for the nonpolar liquid phase. The nonpolar liquid should have a moderately high interfacial tension and a specific gravity approximately equal to that of the polar liquid phase. Representative oils for the nonpolar liquid include silicone oil PDM7040, benzyl benzoate, and pentyl benzoate (specific gravity $\rho_{25}$=0.984, surface tension $\sigma_{25}$=33 mN/m, refractive index $n^D_{20}$=1.495). The quality of the resulting optofluidic device with regards to optical characteristics and upright alignment of the particles at the interface may vary according to the oil used. For example, pentyl benzoate is preferable in certain applications in which the polar liquid is water.

To produce optofluidic devices having different curvatures, isopropanol (1-20% v/v) or other suitable polar organic liquid may be added to water to form a polar liquid phase whose interfacial tension is lower than that of pure water. Upon removal of any excess oil, the particles may be densely packed, covering 90% or more of the interface (FIG. 5(c)). Advantageously the percentage of particles in the proper orientation (i.e., the upright orientation gold face towards oil) is, at least, approximately 80%. And while some of the particles may initially be in an improper orientation, i.e., the flipped orientation, a substantial number of those improperly oriented will usually reorient properly in time. More particularly, it has been observed that the oriented fraction was found to reach about 80% overnight. In addition, sonication or other mechanical operations may increase the rate and degree of reorientation so that the percentage of particles in the upright orientation is higher.

Figure 5D:
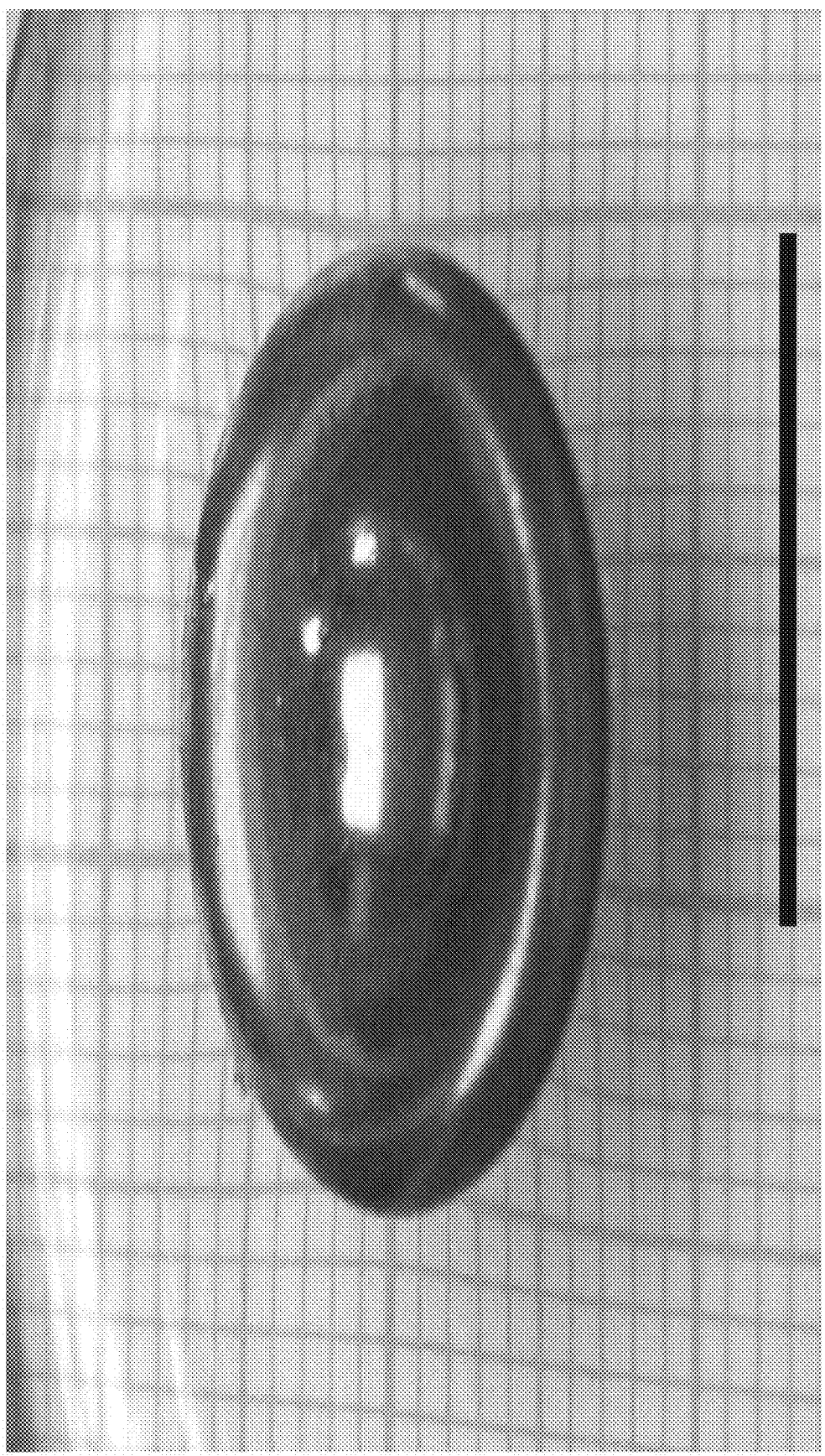

In the particular case of a purely reflective optofluidic device, the coplanar and upright orientational alignment of the particles with the liquid-liquid interface is evidenced by the production of sharp reflected images therefrom (See, e.g., FIG. 5(d)). To evaluate the dynamic stability of these reflective optofluidic devices, free-floating liquid mirrors were excited acoustically at 19 Hz to produce resonant vibrational modes which dramatically distorted their shape. Frame captures of a video are shown in FIGS. 5(e), 5(f), and 5(g). The images demonstrate that the optofluidic device exhibits continuously sharp optical properties while undergoing large dynamic deformations The shape of an optofluidic device so constructed may advantageously be controlled using electrowetting (See, FIG. 6). That is, the shape of the interface(s) along which the optical device(s) are located within the optofluidic device may be selectively controlled. For example, when the optofluidic device is a reflective one as described above, the focal length of such a liquid mirror may be selectively controlled via the electro-wetting response of the polar liquid phase.

Transparent, conducting substrates for these device may be fabricated from indium-tin-oxide (ITO)-coated float glass (Delta Technologies, Stillwater, Minn.) that may be electrically insulated by deposition of 300 nm of $SiN_x$ by—for example—via plasma-enhanced chemical vapor deposition. A layer of approximately 0.5-μm-thick fluorinated polymer (Cytop CTL-809M, Asahi Glass Co., Japan) may then be spin-coated (approximately 10 sec. at 4000 rpm) onto the substrate and cured (approximately 1 h at 40° C., followed by approximately 3 h at 200° C.). This fluorinated polymer layer advantageously makes the substrate hydrophobic and minimizes contact-angle hysteresis for a droplet of water or another polar liquid subsequently deposited thereon.

Figure 6:
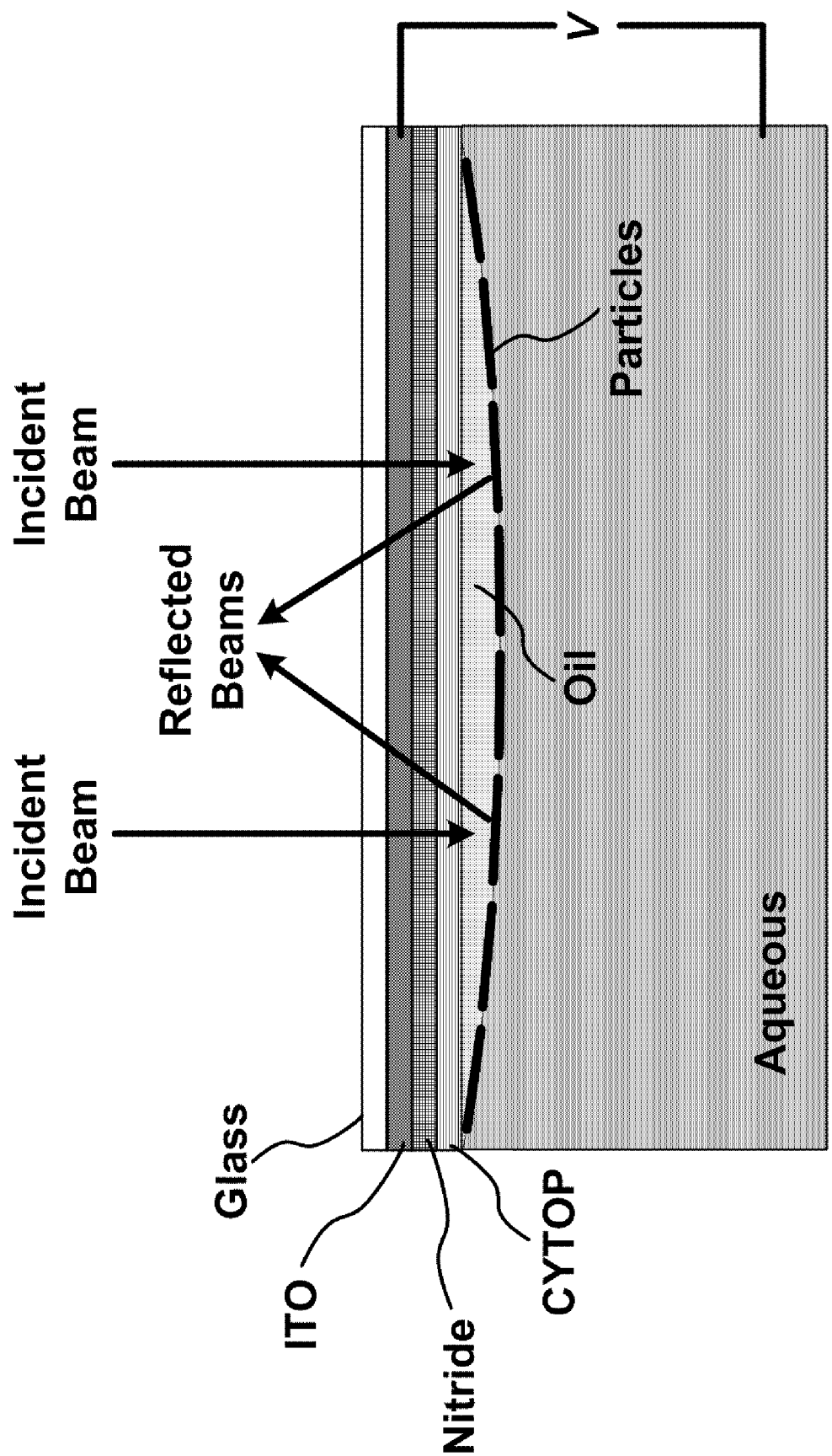
FIG. 6 is a schematic showing a reflective optofluidic device integrated with an electrowetting substrate for producing a change of curvature according to an aspect of the present disclosure.

As shown in FIG. 6, a substrate may be lowered onto the surface of the optofluidic device until both the oil droplet and the water make contact with it. A voltage is applied between the conducting ITO layer of the substrate and a Pt wire electrode in contact with the aqueous subphase (15% propanol, 15 mM NaCl). Increasing the magnitude of the voltage between the ITO layer and the water, e.g., in one direction, results in retraction of the oil droplet's circumference and an increase in its curvature.

In the particular case of such a reflective optofluidic device, the focal length f may be determined by the contact angle θ formed by the water-oil interface with the ITO glass surface, according to the approximate relationship:

$$f^3 = \frac{3\Omega}{8\pi(1-\cos\theta)(2-\cos^2\theta-\cos\theta)}, \quad (1)$$

where Ω is the oil droplet volume. The dependence of the contact angle θ on applied voltage V follows from a classical electrowetting equation modified to account for the fact that the contact angle θ in this case is measured from the oil side rather than from the water side of the interface, thus leading to an increase of θ with applied voltage:

$$\cos\theta(V) = \cos\theta_0 - \frac{\varepsilon_0\varepsilon_r}{2d\gamma_{wo}}V^2. \quad (2)$$

Here, V is the applied voltage; $\theta_o$ is the initial contact angle at V=0; $\gamma_{wo}$ is the water-oil interface energy per unit area; $\in_r$ is the permittivity of the dielectric insulator, $\in_o$ is the permittivity of vacuum; and d is the dielectric thickness. From Eqs. (1) and (2), one can see that the Taylor expansion of f with respect to V takes the form $$f = \sum_{i=0}^{\infty} a_i V^{2i},$$

where the coefficients $a_i$ are functions of $\theta_o$, $\gamma_{wo}$, $\in_r$, and d. For voltages small enough to cause only a modest variation of the contact angle, the first two terms dominate, leading to an approximately linear relationship between f and $V^2$.

Figure 7:
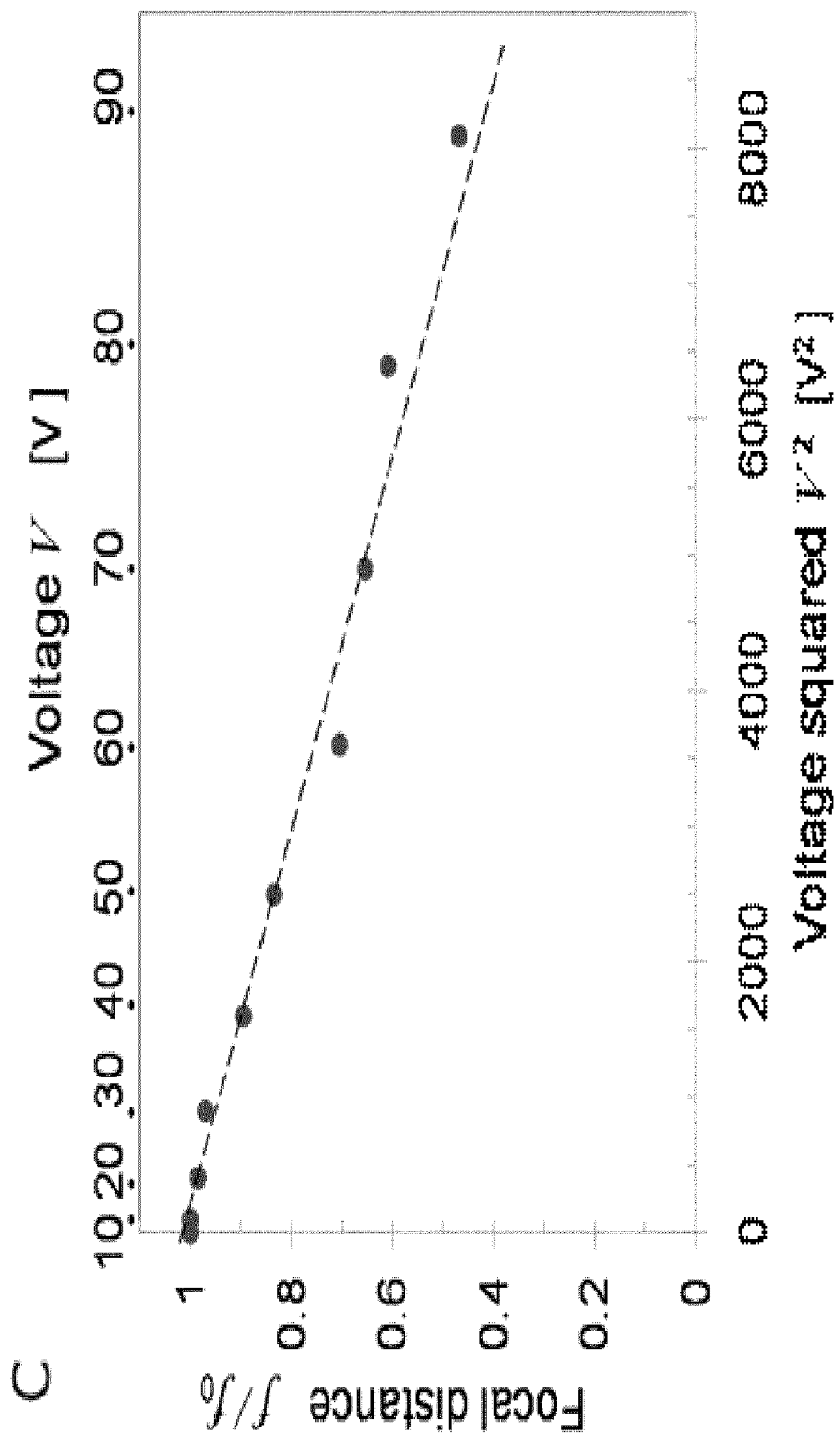
FIG. 7 is a graph showing the relative focal distance as a function of voltage (V) and voltage squared for the device shown in FIG. 6.

The change in curvature of the liquid mirror as a function of voltage may be measured using optical images of the beams reflected from the device's surface and is illustrated in FIG. 7 as a function of voltage (V) and voltage squared ($V^2$). As can be observed from FIG. 7, f is indeed approximately linear in $V^2$, as predicted by the above-discussed theory. in the above-discussed embodiment, the voltage response of the device results in a substantially 2-fold focal-distance range for such reflective devices. The obtained tunablity range, however, does not represent intrinsic limitations of the device. Those skilled in the art will of course appreciate that substantial increases in the voltage sensitivity may be achieved by decreasing the thickness of the insulating layer as is evident from equation 2.

Advantageously, optofluidic devices constructed according to the teachings of the present disclosure may exhibit more complex optical characteristics other than simple reflection. For example, a number of optofluidic devices exhibiting diffraction, generation and detection of light are realizable as well.

As can be appreciated by those skilled in the art, a diffraction grating is typically an optical component having a substantially regular one-dimensional (1D) or two-dimensional (2D) pattern or lattice. The substantially regular pattern or lattice is characterized by repetition length(s) in one or two non-parallel directions, i.e., referred to as lattice length(s). The lattice length(s) are selected, e.g., by the lateral dimensions of the particles so that the particles position themselves at the liquid interface to form a substantially regular lattice that wavelength-selectively reflectively splits (diffracts) an incident light beam into different wavelength reflected light beams that travel in different directions. These directions depend upon the spacing of the grating, i.e., the lattice length (s), and the wavelengths of the light. If the incident light beam has a single wavelength, the reflected light beam will be directed by such an optofluidic grating into specific directions corresponding to the various diffraction orders for the grating.

Figure 8:
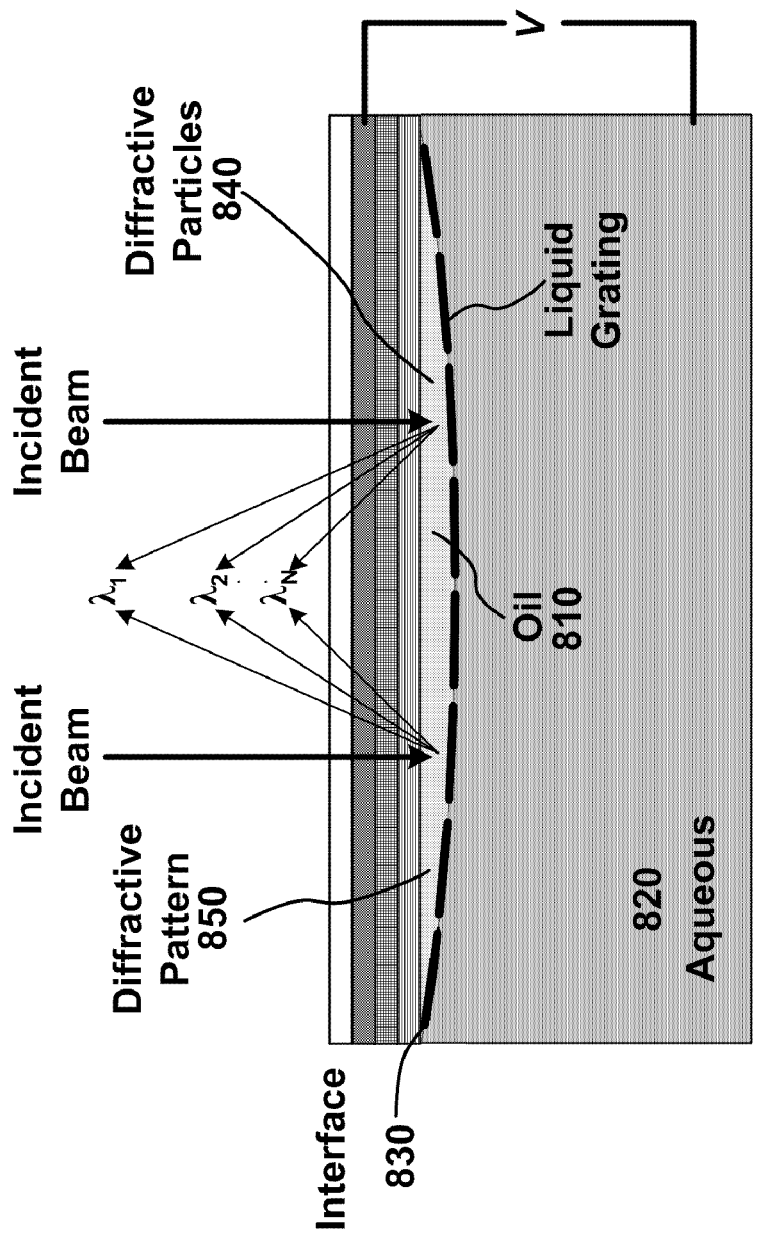
FIG. 8 is a schematic of a diffractive optofluidic device according to an aspect of the present disclosure.

Turning now to FIG. 8, there is shown a schematic of an optofluidic device having such optical diffraction properties. Accordingly, the diffractive optofluidic device 800 includes two substantially immiscible liquids 810, 820 separated by an interface 830 at which are disposed a plurality of particles 840 that are self-assembled into a substantially regular 1D or 2D diffraction grating. As noted previously, the two liquids 810, 820 may be a polar liquid and a nonpolar liquid, e.g., water and an aliphatic oil or suitable substitutes therefore.

The diffractive particles 840 may have a regular pattern 850 disposed upon one of their faces. Advantageously, the particles 840 may be planar, e.g., being thin and having substantially parallel opposite surfaces, so that the surfaces of the grating are orientationally aligned along the local portion of the interface where the particles 840 are located. Advantageously, when the pattern is disposed upon—for example—a gold face then that gold patterned face will preferentially orient towards the oil. Then, the diffractive particles may have polygonal shapes that aid to laterally orient the different particles so that individual gratings on said particles are aligned to form a substantially larger area grating in the optofluidic device.

As can be appreciated by those skilled in the art, the patterning of the particles may be conveniently performed during particle fabrication. Advantageously, the patterning may be simple lines or physical grooves formed in the particles. Alternatively, the patterning may be a series of "pits" or imperfections formed in the particles or coatings applied or deposited thereon. For example, such patterning by lines or pits can form substantially regular 1D or 2D patterns on the individual particles, e.g., to produce 1D optical diffraction gratings and 2D optical diffraction gratings, respectively. Still further, the patterning may be perpendicular lines or concentric rings or (Ronchi gratings or Fresnel reflection or transmission gratings) as well.

When so patterned, the particles 840 will separate an incident polychromatic light beam into its constituent wavelength components; i.e., they are diffractive. Then, different wavelengths of the incident light beam can be reflected into substantially different directions thereby providing for wavelength-dependent separation of said incident light beam. As a result, an optofluidic device such as that shown in FIG. 8 will act as a "liquid grating".

While each of the individual particles 840 themselves exhibit diffractive properties, the diffractive characteristics of the overall optofluidic device is generally influenced by the assembly of the individual particles into the overall device upon their disposition and orientation at/upon the liquid interface.

It is noted at this point that the diffractive optofluidic device shown in FIG. 8 may advantageously have its optical properties changed by—for example—an applied potential as previously described which changes the shape of the liquid/liquid interface. As such, by altering the curvature or shape of the liquid/liquid interface shown in FIG. 8, the focal lengths at each of the constituent wavelengths may be advantageously adjusted.

With reference now to FIG. 9(a), there is shown a light-emitting optofluidic device 900 wherein particles 940 are disposed on/at the liquid/liquid interface 930. Some or all of the particles 940 include one or more light emitters 945 thereon. For example, some or all of the particles 940 may include, e.g., one or more light emitting photodiodes (LEDs) 950 incorporated therein and may optionally include one or more microlenses 960 located and oriented to collimate light output from each of the light emitting diodes. And, while not specifically shown in this FIG. 9(a), those skilled in the art will appreciate that the emitters including any photodiode and microlens will preferably be disposed upon a number of the individual particles 940. Advantageously, the particles 940 are planar, e.g., being thin and having substantially parallel opposite surfaces, so that their surfaces are orientationally aligned along the local portion of the interface where the particles 940 are located. Accordingly, and when arranged upon a curved surface—such as one along a liquid/liquid interface shown—a resulting fan of output beams permits the directed illumination of a wide angle (at high curvature) or narrower angle (at low curvature), i.e., depending on the curvature of said interface.

Advantageously, the LEDs 950 on the individual particles 940 may be powered through the two conductive liquids. That is, each liquid may serve as one terminal for electrically powering the LEDs 950, and the LEDs 950 may have one terminal on each of the opposite faces of such particles 940 so that a current can pass through the LEDs 950 between the liquid on each side of the individual particles 940.

Figure 9C:
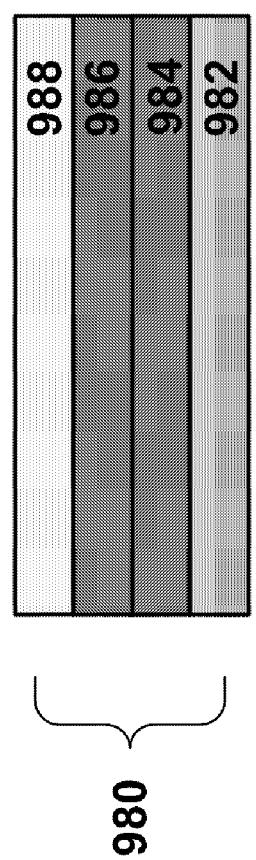
FIG. 9(*a*) is a schematic of a light emitting optofluidic device according to an aspect of the present disclosure.
Figure 9B:
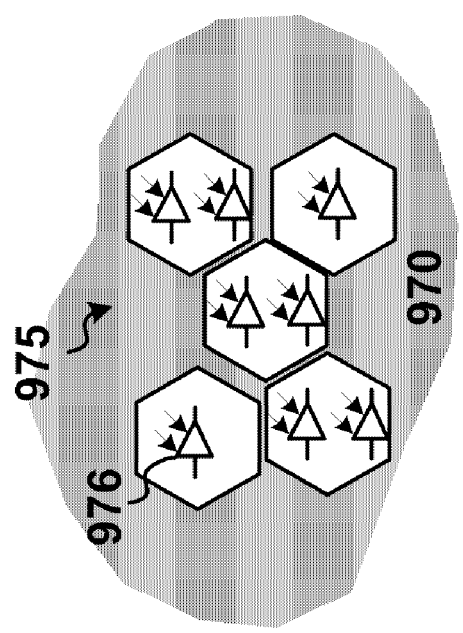

FIG. 9(b) shows a simplified schematic of a number of LED particles 975 self-assembling into an overall optofluidic structure upon disposition on a liquid interface 970. Advantageously, and as shown in FIG. 9(b), individual particles 975 may include one or more light emitting (e.g., LED) elements 976.

FIG. 9(c) shows a cross-section a representative diode element particle 980 including a hydrophilic surface 982, an n-type semiconductor 984, a p-type semiconductor 986 and a hydrophilic surface 988. In such configurations, each hydrophilic surface may be a metal layer such as gold.

As can be appreciated, for such embodiments, it is preferable that the two liquids be sufficiently immiscible and exhibit suitable electrical conductivities. More particularly, two liquids that form a liquid interface upon contact with one another are preferable.

For example, in one embodiment the liquids are preferably polar and include sufficient ionic components to increase such electrical conductivities in leads to the LEDs 950. In such embodiments, example pairs of immiscible liquids may include, e.g., an ionic liquid (e.g., liquid salt) and water or a liquid salt and a polar organic liquid, e.g., an alcohol. Then, a current carried by the liquids powers light emission by LEDs located in the individual particles at the interface between the liquids.

As noted above, the liquids employed are sufficiently immiscible with one another such that a suitable liquid interface is formed when they contact one another. Additionally, for those applications wherein electrical current is conducted via the liquid(s), the liquids are sufficiently electrically conductive.

In those situations where one of the liquids used is an organic liquid, an ionic liquid additive is preferably used to enhance the electrical conductivity of the organic liquid. Preferably, the ionic liquid is compatible with the organic liquid and is readily miscible with the organic liquid. Suitable organic liquids may include single-component or mixtures of straight alkanes and alkenes, branched alkanes and alkenes, aryl compounds such as benzene and toluene, fused aromatic compounds and bridged compounds which may be substituted with one or more groups. The combination of organic liquid and the ionic liquid is selected to provide the desired level of conductivity of the organic medium.

Alternatively, ionic liquids—ionic substances with melting points at or below room temperature—may be employed. For the purposes of this application, ionic liquids which are immiscible with water are particularly attractive. Many ionic liquids are known, which provides flexibility in the liquids chosen for the instant application. A common group of ionic liquids includes nitrogen-containing organic cations and inorganic anions.

In some such embodiments, the shape of the liquid interface may be adjustable by a voltage (not shown) applied between one of the substrates and a polar one of the liquid phases. As previously described, such a control voltage can be used to permit selectively adjusting the curvature of the liquid interface thereby enabling an adjustment of the angular width of the fan of output light.

In a preferred configuration, the optofluidic lenses collimate the emitted light into narrow beams and the beams point outwards; i.e., in a downward direction in FIG. 9. At high curvatures of the interface, the diffracted single-wavelength light can fan out over a wide solid angle. At low curvatures of the interface, such diffracted light illuminate a narrower solid angle, like a colored spotlight.

Figure 10:
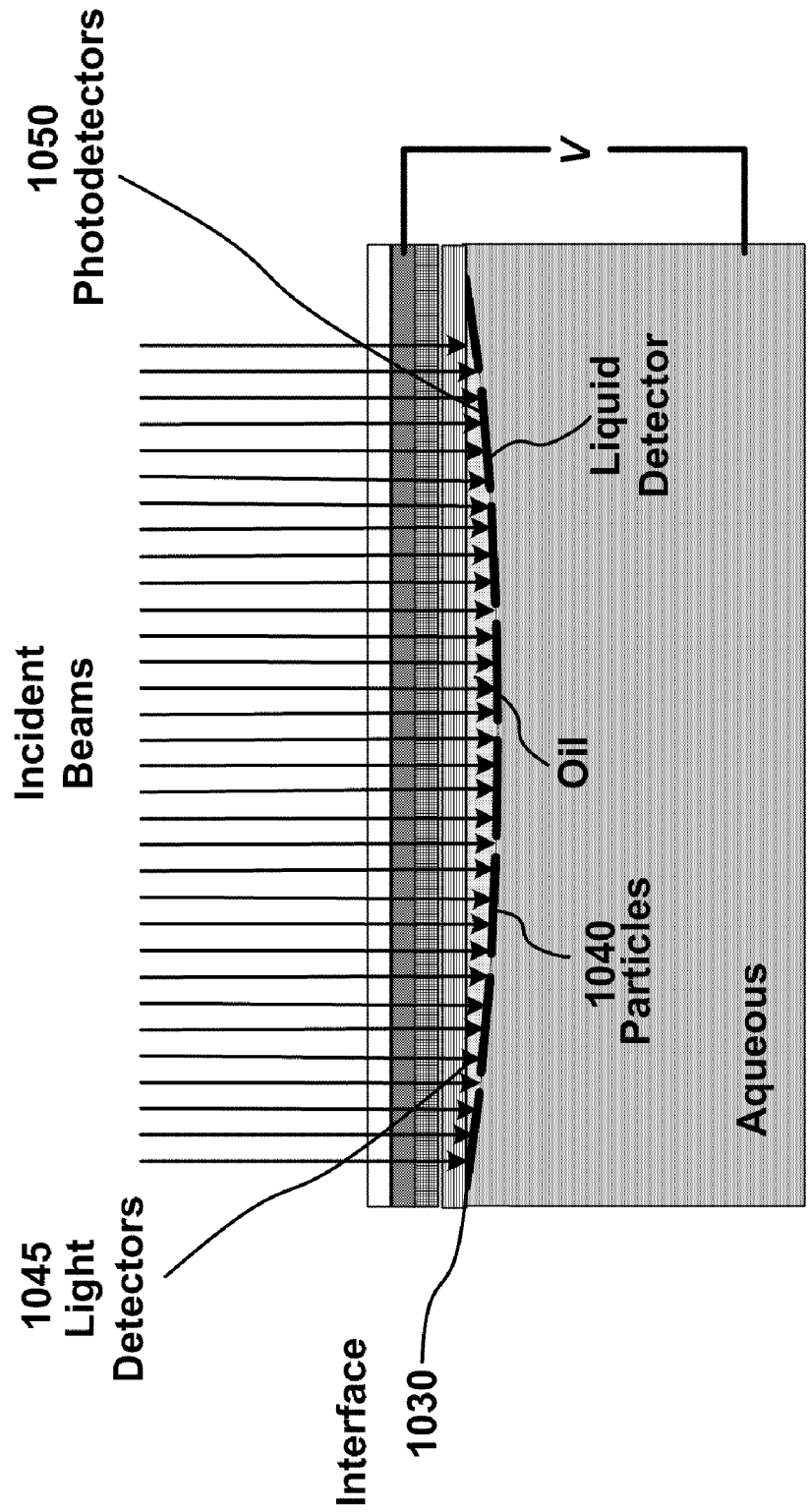
FIG. 10 is a schematic of a photodetecting optofluidic device according to an aspect of the present disclosure.

Turning now to FIG. 10, there is shown a detecting optofluidic device 1000 wherein some or all of the particles 1040 disposed on/at the liquid/liquid interface 1030 include photo detectors 1045. Advantageously, the particles 1040 are planar, e.g., being wide and thin and having substantially parallel opposite surfaces, so that their surfaces are orientationally aligned along the local portion of the interface where the particles 1040 are located. The photo detectors 1045 may be photodiodes 1050 having, e.g., one electrical input on each of the opposite faces of the individual planar particles 1040. further include arrangements of one or more photodiodes 1050 into—for example—a photodetector array of photodiodes. And while not specifically shown in this FIG. 10, those skilled in the art will appreciate that the detectors may be disposed upon a number of the individual particles 1040. When arranged in this manner, the "liquid detector" so constructed may comprise an array or arrays of photodetectors which are sensitive to and produce one or more output signals in response to incident light in a preselected wavelength range, e.g., corresponding to photon energies larger than the bandgap of the semiconductor at the junctions of said photo diodes. Advantageously, the photodetectors 1045 may be powered through the use of conductive liquids. Similarly, output data from the photodetectors may be so conveyed for external processing via circuitry and transmission elements located on the individual particles 1040. Finally, the individual photodetectors may advantageously be sensitive to particular wavelength(s) of incident light and may include microlenses to focus incident light on light detecting diode junctions (not specifically shown).

Those skilled in the art will readily appreciate that the individual particles 1045 and/or photodetectors 1045 thereon may include on-board digital memories and processing units, which are configured to locally store data associated with the intensities of detected light. Alternatively, the individual particles 1045 and/or photodetectors 1045 thereon may include wireless transmitters which may be used to transmit data associated with the detected light to external systems for storage and/or processing and/or display of said data.

At this point, while we have discussed and described the invention using some specific examples, those skilled in the art will recognize that our teachings are not so limited. Accordingly, the invention should be only limited by the scope of the claims attached hereto.

The invention claimed is:

1. An optofluidic device comprising:
   a liquid having an surface; and
   a layer of particles disposed along the surface, said particles include an optical grating, a light intensity detector, or a semiconductor light emitter.

2. The device of claim 1 wherein said liquid surface is formed at a boundary between two substantially immiscible liquids.

3. The device of claim 1 wherein said particles have orientations with respect to said surface that are stable with respect to flipping in response to mechanical perturbations of the apparatus.

4. The device of claim 2 wherein each particle includes one or more diodes.

5. The device of claim 4, wherein each liquid is a polar liquid that has an electrical contact with one lead of the diodes.

6. The device of claim 1 further comprising a control circuit for selectively controlling the curvature of the interface.

7. The device of claim 2, wherein each particle has an optical grating thereon.

8. The device of claim 1 wherein said particles are optical detectors, each particle further comprising a communications circuit for wirelessly communicating an indication of a light intensity detected thereby.

9. An optofluidic apparatus comprising:
   a liquid having an interface; and
   a plurality of optical particles disposed along the interface, said particles being selected from the group consisting of: optical gratings, optical detectors and optical emitters.

10. The optofluidic apparatus of claim 9 wherein said interface is formed at a boundary between first and second substantially immiscible liquids.

11. The optofluidic apparatus of claim 10 wherein said liquids are both polar liquids.

12. The optofluidic apparatus of claim 11 wherein each particle has a hydrophobic side and a hydrophilic side.

13. The optofluidic apparatus of claim 11 further comprising a circuit that is connected to drive a current through the particles via the two substantially immiscible liquids.

14. The optical apparatus of claim 9, further comprising electrodes located to selectively control a curvature of the interface.

15. The optical apparatus of claim 14, each individual particle includes a diode having a first electrical contact along a surface of the individual particle that contacts the first of the liquids and having a second electrical contact along a surface of the individual particle that contacts the second of the liquids.

16. The optical apparatus of claim 9 wherein said particles include one or more optical detectors and said apparatus further comprises a means for communicating an indication of light detected by the one or more detectors.

17. A method, comprising:
processing incident light with a layer of optical particles disposed along a liquid interface, each particle is configured to diffract said light or detect said light.

18. The optofluidic method of claim 17 wherein said liquid interface is formed at a boundary between two substantially immiscible liquids, said method further comprising the steps of:
altering a curvature of the interface during the processing.

19. The optofluidic method of claim 18, further comprising the steps of:
sending electrical current through the particles via the liquids.

20. The optofluidic method of claim 17 wherein said processing is detecting, said method further comprising the steps of:
generating an indication of the intensity or wavelength of the incident light.

* * * * *